United States Patent Office 3,113,868
Patented Dec. 10, 1963

3,113,868
PROCESS FOR PREPARING A COOKED CEREAL
AND THE RESULTING PRODUCT
Louis J. Lee, Rochester, N.Y., assignor to Eastman Kodak Company, Rochester, N.Y., a corporation of New Jersey
No Drawing. Filed Jan. 16, 1961, Ser. No. 82,730
16 Claims. (Cl. 99—83)

This invention relates to foods. More particularly it relates to so-called cooked cereals.

Cooked cereals are prepared foodstuffs of grain, which are generally marketed in a dehydrated condition and which usually must be cooked for a short period of time in boiling water in order to be in a normally edible condition. Representative of these cooked cereals are the oat, corn, rice and wheat meals or farinas, rolled oats and the like, marketed under such brand names as Cream-of-Wheat, Cream-of-Rice, Ralston, Quaker Oats, etc. As used herein "cooked cereals" includes not only regular cooked cereals but also those cooked cereals of the "instant" variety, that is, those which have been pretreated so that only a minimal cooking time is involved. In either case cooking causes the dehydrated grain particles to absorb water and to soften, making the same palatable and digestible.

Cooked cereals, however, present a problem in that generally they tend to become pasty on cooking and to lose particle texture and flavor on prolonged heating. The seriousness of this problem can be appreciated when it is realized that in many commercial eating establishments, particularly in cafeterias, it is customary to cook up a large batch of a cooked cereal and to hold it for several hours in a suitable container on a steam table, for example, at the desired serving temperature which is generally near the boiling temperature of water, while removing individual servings from the batch as needed or upon order. Under such conditions loss of particle texture and flavor occurs. Indeed, after several hours on a steam table it is not unusual for a batch of cooked cereal to become a congealed, gelatinous mass. As a result, the batch is unappetizing in appearance and taste and usually is dumped into a garbage can without further ado. Hence, substantial wastage may be involved.

A general object of this invention is to solve this problem.

A specific object of this invention is to provide cooked cereals of improved composition, which remain paste free and relatively stable in texture and particle flavor on prolonged cooking and storage at elevated temperatures.

Another specific object is to provide a process for preparing cooked cereals of improved composition, which cereals remain paste free and relatively stable in texture and particle flavor in the presence of water at elevated temperatures. An even more specific object is to provide a process for chemically treating a cooked cereal which otherwise would tend to deteriorate in texture and flavor and to become pasty in the presence of water at elevated temperatures, which process results in a cooked cereal in which these tendencies are minimized.

These and other objects which may appear as this specification proceeds are achieved by this invention.

In summary, this invention has both a composition-of-matter aspect and a process aspect. From a composition view the invention comprises a cooked cereal the particles of which at least at the time of cooking comprise an edible monoglyceride of the chemically saturated type. From a process point of view the invention comprises the step of contacting cooked cereal particles at least at the time of cooking with an edible monoglyceride of the chemically saturated type.

The monoglycerides of this invention are readily available, edible, fatty materials which chemically are saturated higher fatty acid monoesters of glycerol. The fatty acid moieties of the monoesters broadly comprise 8 to 22 carbon atoms and commonly 14 to 20 carbon atoms. Fatty acid moieties having less than 8 carbon atoms may be involved but the effectiveness of the corresponding monoglycerides is not adequate at practical concentrations. Fatty acid moieties of more than 22 carbon atoms would be satisfactory and could be used. Fatty acids with more than 22 carbon atoms and corresponding glycerides are not available on a commercial scale. Hence, 22 carbon atoms represent a practical upper limit.

The monoglycerides of this invention can be prepared in accordance with well known procedures by direct esterification of saturated fatty acids with glycerine followed preferably by distillation to obtain a high purity monoglycerides mixture. The monoglycerides of this invention can also be prepared by the glycerolysis of saturated vegetable and animal oils, that is, by the interesterification of glycerine with chemically saturated triglycerides, such as those which make up hydrogenated lard, hydrogenated beef tallow, hydrogenated soybean oil, hydrogenated cottonseed oil and similar chemically saturated edible fats and oils. Preferably the resulting interesterification reaction mixture is thereafter subjected to thin film, vacuum distillation to distill off a high purity mixture of edible monoglycerides of the chemically saturated type. This preparation of distilled, high purity, monoglyceride compositions is disclosed by Kuhrt in U.S. Patents, Nos. 2,634,234, 2,634,278 and 2,634,279. Such distilled monoglyceride compositions usually contain monoglycerides at a concentration of at least 90% by weight. Moreover, the high purity monoglyceride compositions of commerce are usually solid at room temperature.

Total monoglycerides concentration in the cooked cereal compositions of this invention is in a range preferably from about 0.3 to about 3 percent by weight of the dry cereal and usually from about 1 to about 2.5 weight percent of the dry cereal. A concentration less than about 0.3 weight percent is possible but the effect of the monoglycerides is insignificant. A concentration greater than about 3 weight percent is also possible but the increase in effect over the effect at about the 3 weight percent level does not appear to be of such magnitude as to justify from a practical point of view the increase in concentration.

The monoglycerides of this invention may be incorporated with the cooked cereal particles or granules at the stage of cooking of the cereal, at the stage the cereal particles or granules are first formed in the manufacturing process, as in a grinding stage, or at any stage inbetween, as during the roasting stage. A preferred method of incorporation involves forming a dispersion of monoglyceride composition (as by heating water to 150° F. and adding with stirring the monoglyceride composition) and then adding the dispersion to partially cooked cereal in boiling water. The quantity of water in the dispersion and the quantity of boiling water should equal the desired total quantity of cooking water for the cooked cereal.

These concepts and features of advantage of this invention are demonstrated by the following examples. In this regard these examples are presented for purposes of illustration and not of restriction.

*Example 1*

This example illustrates the improvement obtained when supplying the basic concepts of this invention to oat meal.

A commercially available, dry, oat meal cereal was divided into three equal portions. Three equal portions of water, each in the amount of ¾ of the ultimate amount to be used, were brought to a boil and the corresponding portions of oat meal and table salt added thereto.

Three equal portions of water, each in the amount of ¼ of the ultimate amount to be used, were heated to a temperature of 150° F. Nothing was added to one water portion which was intended to be the basis of a control batch. To the second portion was added with stirring a quantity of Myverol distilled monoglycerides Type 18–07 composition equal to 1 weight percent of a dry cereal portion. A dispersion formed. To the third portion was added with stirring a quantity of Myverol distilled monoglycerides Type 18–07 composition equal to 2½ percent by weight of a dry cereal portion. Again, a dispersion formed.

The Myverol distilled monoglycerides Type 18–07 product is an edible, chemically saturated monoglyceride composition prepared by the aforementioned interesterification and distillation procedure from glycerine and completely hydrogenated cottonseed oil. This commercially available product comprises a mixture of monoglycerides at a concentration of at least 90 weight percent in which the stearic acid and palmitic acid moieties predominate.

In accordance with the directions on the cereal package in which the oat meal cereal was obtained, the water portions were brought to a boil and the cereal portions added. Approximately one minute later the water-monoglycerides dispersions were added to the corresponding water-cereal portions. When the minimum cooking time as set out in the directions on the package was reached, the following results were observed:

*Control.*—Cereal flakes had pasty texture and appeared very wet on surface.

*1% Monoglycerides.*—Cereal flakes much dryer than control and less pasty.

*2½% Monoglycerides.*—Cereal flakes appeared dry on surface with no moisture layer. Texture of the cereal was non pasty and flavor seemed to be improved over that of the control.

After holding the three batches at steam bath temperature for three hours, the following results were observed:

*Control.*—Cereal had pasty appearance. The flakes were very soft and fairly gelatinized. Flakes had lost their essential completeness.

*1% Monoglycerides.*—Cereal flakes were better than control and had fairly good texture.

*2½% Monoglycerides.*—Cereal flakes presented a dry surface. Under the surface the flakes appeared to retain their original shape—good non pasty texture.

Thus, the addition of edible, chemically saturated monoglycerides to oatmeal at least at the time of cooking prevented loss of texture and flavor even after being subjected to elevated temperatures over a relatively lengthy period of time. Such occurred at both the 1 weight percent and 2½ weight percent levels with the greater improvement occurring at the 2½ weight percent level.

*Example 2*

This example illustrates the improvement obtained by applying the basic concepts of this invention to a farina cereal.

The required proportions of cold water, a farina and salt and a quantity of Myverol distilled monoglycerides Type 18–07 composition equal to 2 percent by weight of the dry farina were blended together to form a test batch. The batch was heated slowly, while stirring, to boiling and then cooked for 5 minutes at which point the batch was considered to be done. At the same time a control batch was made in accordance with directions on the box in which the farina was obtained. The proportions of salt, water and dry cereal were the same as in the test batch. The salt was added to the water and the salt water was brought to a boil. The cereal was poured into the boiling salt water. The mixture was brought to a boil and cooked for 5 minutes. The following results were observed:

*Control.*—Farina particles were soft and pasty.

*2% Monoglycerides.*—Farina particles had definite shape and were not clumped together. Cereal was less pasty and on eating had "fast mouth get away."

After holding the two batches at steam bath temperatures for three hours the following results were observed:

*Control.*—Farina particles had clumped together in a firm, gelatinous ball.

*2% Monoglycerides.*—Same as when originally cooked.

Thus, the concepts of this invention are effective not only with oat meal but also with farina. Similar results are observed with other cooked cereals which tend to become pasty and to lose flavor in the presence of water at elevated temperatures. And in this regard these effects are realized only with edible, chemically saturated monoglycerides and not with diglycerides and triglycerides.

Although it is not precisely known what occurs when cooked cereal particles are contacted with an edible, chemically saturated monoglyceride, there is some evidence that the monoglycerides form complexes with free soluble amylose which otherwise is liberated from the cereal particles upon cooking. These complexes, it is thought, prevent the amylose from forming a gelatinous mass.

Other embodiments, advantages and features of this invention will be apparent to those in the exercise of ordinary skill in the art upon reading the foregoing specification. In this regard, it is intended that all embodiments of this invention including variations and modifications thereof embracing the spirit and essential characteristics thereof be within the scope of the claimed subject matter unless expressly excluded by claim language.

I claim:

1. A cooked cereal comprising an edible, chemically saturated monoglyceride at a concentration of at least about 0.3 percent of the dry weight of said cereal.

2. A cooked cereal comprising an edible, chemically saturated monoglyceride composition at a concentration in a range from about 0.3 to about 3 percent of the dry weight of said cereal.

3. A cooked cereal comprising an edible, chemically saturated monoglyceride composition at a concentration in a range from about 0.3 to about 3 percent of the dry weight of said cereal, at least about 90 percent by weight of said monoglyceride composition consisting of edible, chemically saturated monoglycerides in which the fatty acid moieties have from 8 to 22 carbon atoms.

4. A cooked cereal comprising an edible, chemically saturated monoglyceride composition at a concentration in a range from about 1 to about 2½ percent of the dry weight of said cereal, at least about 90 percent by weight of said monoglyceride composition consisting of edible, chemically saturated monoglycerides in which the fatty acid moieties have from 14 to 20 carbon atoms.

5. A cooked cereal consisting essentially of oat meal and an edible, chemically saturated monoglyceride composition at a concentration in a range from about 1 to about 2½ percent of the dry weight of said oat meal, said composition being derived from hydrogenated cottonseed oil and having a monoglycerides concentration of at least about 90 percent by weight.

6. A cooked cereal consisting essentially of a farina and an edible, chemically saturated monoglyceride composition at a concentration in a range from about 1 to about 2½ percent of the dry weight of said farina said composition being derived from hydrogenated cottonseed oil and having a monoglycerides concentration of at least about 90 percent by weight.

7. A cooked cereal consisting essentially of water, table salt, cooked cereal and an edible, chemically saturated monoglyceride composition at a concentration in a range from about 0.3 to about 3 percent of the dry weight of said cereal, at least about 90 percent by weight of said monoglyceride composition consisting of edible, chemically saturated monoglycerides in which the fatty acid moieties have from 8 to 22 carbon atoms.

8. A cooked cereal consisting essentially of cooked cereal particles which have been contacted with an edible, chemically saturated monoglyceride composition at a concentration in a range from about 0.3 to about 3 percent of the dry weight of said cereal particles.

9. A cooked cereal consisting essentially of cooked cereal particles which have been contacted with an edible, chemically saturated monoglyceride composition at a concentration in a range from about 0.3 to about 3 percent of the dry weight of said cereal particles, at least about 90 percent by weight of said monoglyceride composition consisting of edible, chemically saturated monoglycerides in which the fatty acid moieties have from 8 to 22 carbon atoms.

10. A cooked cereal consisting essentially of cooked cereal particles which have been contacted with an edible, chemically saturated monoglyceride composition at a concentration in a range from about 0.3 to about 3 percent of the dry weight of said cereal particles, at least about 90 percent by weight of said monoglyceride composition consisting of edible, chemically saturated monoglycerides in which the fatty acid moieties have from 14 to 20 carbon atoms.

11. A cooked cereal consisting essentially of cooked cereal particles which have been contacted with an edible, chemically saturated monoglyceride composition derived from hydrogenated cottonseed oil, said composition being at a concentration in a range from about 1 to about 2½ percent of the dry weight of said particles.

12. A process for preparing a cooked cereal, which comprises contacting cooked cereal particles, at least at the time of cooking the same, with an edible, chemically saturated monoglyceride at a concentration of at least about 0.3 percent of the dry weight of said cereal.

13. A process for preparing a cooked cereal, which comprises contacting cooked cereal particles, at least at the time of cooking the same, with an edible, chemically saturated monoglyceride having a fatty acid moiety of 8 to 22 carbon atoms at a concentration of at least about 0.3 percent of the dry weight of said cereal.

14. A process for preparing a cooked cereal, which comprises contacting cooked cereal particles, at least at the time of cooking the same, with an edible, chemically saturated monoglyceride composition at a concentration in a range from about 0.3 to about 3 percent of the dry weight of said cereal, particles at least about 90 percent by weight of said monoglyceride composition consisting of edible, chemically saturated monoglycerides in which the fatty acid moieties have from 8 to 22 carbon atoms.

15. A process for preparing a cooked cereal, which comprises contacting cooked cereal particles, at least at the time of cooking the same, with an edible, chemically saturated monoglyceride composition at a concentration in a range from about 1 to about 2½ percent of the dry weight of said cereal particles, said composition being derived from hydrogenated cottonseed oil.

16. A process for preparing a cooked cereal, which comprises: forming an aqueous dispersion of an edible, chemically saturated monoglyceride composition, the quantity of said composition being in a range of 0.3 to 3 percent of the dry weight of the cooked cereal particles to be treated; and contacting said cooked cereal particles with said monoglyceride composition by admixing said aqueous dispersion with said cooked cereal particles and cooking the resultant mixture.

References Cited in the file of this patent

UNITED STATES PATENTS 2,928,743    Rutgers _____ Mar. 15, 1960

OTHER REFERENCES

Cressy: "Glyceryl Monostearate in Food," Food Manufacture, April 1957, pp. 165–168. Copy in Scientific Library.